United States Patent [19]
Kaufman

[11] Patent Number: 5,272,189
[45] Date of Patent: Dec. 21, 1993

[54] REDUCED YELLOWING ELECTRODEPOSITABLE COATING COMPOSITION

[75] Inventor: Marvin L. Kaufman, Pittsburgh, Pa.

[73] Assignee: PPG Industries, Inc., Pittsburgh, Pa.

[21] Appl. No.: 962,568

[22] Filed: Oct. 19, 1992

[51] Int. Cl.$^5$ ............................................... C08L 63/02
[52] U.S. Cl. ................................. 523/415; 204/181.4; 525/124; 528/45; 528/117
[58] Field of Search .................... 523/415; 525/124; 528/45, 117; 204/181.4

[56] References Cited

U.S. PATENT DOCUMENTS

| | | | |
|---|---|---|---|
| 4,463,143 | 7/1984 | Holubka | 525/528 |
| 4,748,200 | 5/1988 | Nasu | 528/45 |
| 4,755,418 | 7/1988 | DebRoy et al. | 428/215 |
| 5,114,552 | 5/1992 | McCollum et al. | 523/415 |

FOREIGN PATENT DOCUMENTS 2038786  9/1991  Canada .

OTHER PUBLICATIONS

Iwakura et al, *J. Org. Chem.*, 29, p. 379 (1964).
Iwakura et al, *J. Polymer Sci.*, 4, p. 751 (1966).
Kordomenos et al, *J. Ctgs. Tech.*, 55, No. 700, pp. 49, 59 (1983).
Kordomenos et al, *Macromolecules*, 1987, 20, 2077-2083.
Sehovic et al, *J. Ctgs. Tech.*, 59, No. 747, p. 29 (1987).

*Primary Examiner*—Melvyn I. Marquis
*Assistant Examiner*—D. Aylward
*Attorney, Agent, or Firm*—William J. Uhl

[57] ABSTRACT

Electrodepositable coating compositions comprising an active hydrogen-containing ionic resin and a curing agent which contains blocked isocyanate groups and oxazolidone groups are disclosed. These coating compositions reduce the tendency of cured electrodeposited films to cause yellowing in subsequently applied topcoat systems. The use of these electrodepositable coating compositions in the process of electrodeposition is also disclosed.

11 Claims, No Drawings

REDUCED YELLOWING ELECTRODEPOSITABLE COATING COMPOSITION

FIELD OF THE INVENTION

The present invention relates to electrodepositable coating compositions and to their use in the process of electrodeposition. More specifically, the present invention relates to electrodepositable coating compositions which contain curing agents that provide resistance to yellowing when the composition is electrodeposited and cured.

BACKGROUND OF THE INVENTION

Certain aqueous coating compositions can be applied by the process of electrodeposition. Electrodeposition is the process whereby a coating composition is placed in contact with an electrically conductive anode and an electrically conductive cathode with the surface to be coated being either the anode or the cathode. Following contact with the coating composition, an adherent electrically insulating film is deposited on one of the electrodes when a sufficient voltage is impressed between the electrodes. Electrodepositable coating compositions can be applied to a variety of electroconductive substrates especially metals such as steel, aluminum, copper, magnesium and conductive carbon-coated materials.

Electrodepositable coating compositions which are applied cathodically (that is, the surface to be coated is the cathode) are preferred to those which are applied anodically because cationic compositions usually provide superior corrosion resistance. Electrodepositable coating compositions based on epoxy-derived resins which are crosslinked with materials containing blocked isocyanate groups upon application of heat are very common in the automotive industry.

Often, a topcoat system is subsequently applied to electrodeposited, cured coatings in order to achieve even greater corrosion resistance and durability than the electrodeposited coating alone would provide. Additionally, topcoat systems are applied in order to provide an attractive, glossy finish which must match a specific color standard. This is especially true in the automotive industry, where, for example, a non-conductive plastic part which has not been electrocoated abuts a metal part which has been electrocoated, and the color of these parts must match.

Thermosetting topcoat systems which contain acrylic, polyester and/or alkyd resins that crosslink with aminoplast or blocked polyisocyanate curing agents are very common in the automotive industry. These topcoats can be spray-applied as a single color coat or as a two-coat base/clear system. It is well known in the art that certain light-colored topcoat systems such as whites, light blues, creams or tans are subject to yellowing when they are applied over certain cured electrodepositable coating compositions. Such yellowing can be caused by various factors such as the electrodeposition coating composition, the topcoat composition or the chemical composition of the atmosphere in which the coating compositions are cured. Yellowing which is related to the electrodeposition coating composition will hereinafter be referred to as "ED-related yellowing."

ED-related yellowing is especially pronounced when low molecular weight aromatic blocked isocyanate curing agents are used in the electrodepositable coating composition. Aliphatic blocked isocyanate curing agents produce electrodepositable coating compositions which cause less ED-related yellowing in the subsequently applied topcoat systems, but these curing agents are generally more expensive than certain aromatic blocked isocyanate curing agents such as toluene diisocyanate (TDI). Aromatic blocked isocyanate curing agents which have higher molecular weight than TDI also produce electrodepositable coating compositions which tend to cause less ED-related yellowing in the subsequently applied topcoat systems.

The present invention is based on the discovery that blocked isocyanate curing agents which contain oxazolidone groups in addition to blocked isocyanate groups produce very little ED-related yellowing in subsequently applied topcoat systems. This allows formulation of non-yellowing or reduced yellowing electrodepositable coating compositions with a wide variety of blocked isocyanate curing agents, particularly blocked aromatic isocyanate curing agents based on relatively low molecular weight aromatic isocyanates such as TDI, which are non-yellowing.

SUMMARY OF THE INVENTION

The present invention is directed toward an electrodepositable coating composition which minimizes ED-related yellowing in subsequently applied topcoats. The invention also described a method for coating a conductive substrate by the process of electrodeposition using the electrodepositable coating compositions described herein in order to produce an electrocoated article.

The electrodepositable coating composition comprises:

A. an active hydrogen-containing ionic resin; and
B. a curing agent which contains blocked isocyanate groups and groups of the following structure:

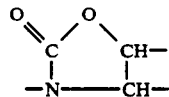

As used herein, the term "ED-related yellowing" generally refers to the tendency of certain electrodepositable coating compositions to cause a yellowed color in a subsequently applied topcoat system during the curing process of said topcoat system. ED-related yellowing is of two types. One type is so-called "fume-yellowing", in which it is believed that a volatile species derived from an isocyanate moiety condenses in intricate areas on the automobile body upon curing of the electrodeposited coating. When the topcoat is subsequently applied and cured, the isocyanate-derived product again volatilizes and fouls the topcoat. Another type of ED-related yellowing is so-called "bleed-through yellowing", in which it is believed that decomposition products of the blocked isocyanate curing agents penetrate into the topcoat through an intermediate sealant layer.

DETAILED DESCRIPTION

The active hydrogen-containing resins of the present electrodepositable composition include both anionic resins and cationic resins with the cationic resins being preferred because they usually provide superior corrosion resistance. The ionic resins should contain active hydrogens such as those provided by hydroxyl, primary amino, secondary amino and thiol groups, including mixtures thereof. The active hydrogens are reactive with blocked isocyanate groups resulting in a curing reaction when the coating compositions are heated. Particularly preferred active hydrogen group containing ionic resins are cationic resins which contain amine salt groups such as the acid-solubilized reaction products of polyepoxides and primary or secondary amines as described in U.S. Pat. Nos. 3,663,389; 3,922,253; 3,984,299; 3,947,388; 3,947,339 and 4,031,050.

Besides the epoxy-amine reaction products, active hydrogen-containing ionic resins can also be selected from cationic acrylic resins such as those described in U.S. Pat. Nos. 3,455,806 and 3,928,157. Further active hydrogen-containing ionic resins can be selected from cationic polyester resins, and the like, which contain ionic groups and active hydrogen groups.

Besides resins containing amine salt groups, resins containing quaternary ammonium salt groups can also be employed. Examples of these resins are those which are formed from reacting an organic polyepoxide with a tertiary amine salt. Such resins are described in U.S. Pat. Nos. 3,962,165; 3,975,346; 4,001,101 and 4,101,486. Examples of other cationic resins are ternary sulfonium salt group-containing resins and quaternary phosphonium salt group-containing resins such as those described in U.S. Pat. Nos. 3,793,278 and 3,984,922, respectively.

The resins to which the present invention is particularly effective are those cationic resins which contain primary and/or secondary amine groups. Such resins are described in U.S. Pat. Nos. 3,663,389; 3,947,339 and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

Modified resins such as those obtained by chain extending the polyepoxide to increase its molecular weight are also preferred in the practice of the invention. Such materials are described in U.S. Pat. No. 4,148,772 in which the polyepoxide is chain extended with a polyester polyol and in U.S. Pat. No. 4,468,307 in which the polyepoxide is chain extended with a particular polyether polyol. Also, chain extension methods such as those disclosed in Canadian Patent 1,179,443 can be used.

The epoxy polymers which are used in preparing the cationic resins are polyepoxides, that is, polymers having an epoxy equivalency greater than 1, preferably about 2 or more. Preferred are polyepoxides which contain 1,2-epoxide groups and which are difunctional with regard to epoxy. The preferred polyepoxides are polyglycidyl ethers of cyclic polyols. Particularly preferred are polyglycidyl ethers of polyphenols such as bisphenol A.

Besides the polyglycidyl ethers of polyphenols, epoxy-containing polymers which can be used are acrylic polymers which contain epoxy groups. These polymers are formed by polymerizing an unsaturated epoxy group-containing monomer such as glycidyl acrylate or glycidyl methacrylate with one or more polymerizable ethylenically unsaturated monomers. Examples of these polymers are described in U.S. Pat. No. 4,001,156.

The oxazolidone group-containing curing agents contain groups of the following structure:

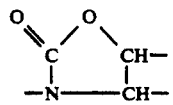

More specifically, the curing agents contain groups of the following structure:

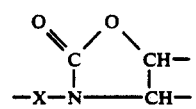

where X is the residue of an isocyanate, preferably a polyisocyanate, more preferably an aromatic isocyanate, most preferably an aromatic polyisocyanate. Preferably, the curing agent contains groups of the following structure:

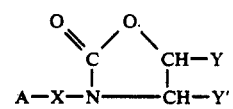

where X is as described above; and where A is a (are) blocked isocyanate group(s), preferably of the structure:

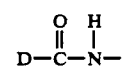

where D is a radical derived from the group consisting of alcohols, including glycol ethers and amino alcohols, lactams, ketoximes, aliphatic amines and beta-dicarbonyl compounds, and where Y and Y' are different and are hydrogen and a residue derived from an epoxy resin, preferably a polyepoxide.

The X groups in the above-mentioned structural formulas are derived from isocyanates which can be aliphatic or aromatic isocyanates, preferably polyisocyanates, with the aromatic polyisocyanates being most preferred. Representative examples of the aliphatic polyisocyanates are trimethylene, tetramethylene, tetramethylxylylene, pentamethylene, hexamethylene, 1,2-propylene, 1,2-butylene, 2,3-butylene, and 1,3-butylene diisocyanates. Also suitable are the cycloalkylene compounds such as 1,3-cyclopentane, 1,4-cyclohexane, 1,2-cyclohexane and isophorone diisocyanates. Representative examples of the aromatic polyisocyanates are m-phenylene, p-phenylene, 4,4-diphenyl, 1,5-naphthalene and 1,4-naphthalene diisocyanates and diphenylmethane-4,4-diisocyanate (MDI), polymeric diphenylmethane-4,4-diisocyanate (crude MDI); the aliphatic-aromatic compounds such as 2,4- or 2,6-tolylene diisocyanates, or mixtures thereof, 4,4-toluidine, and 1,4-xylylene diisocyantes; the nuclear-substituted aromatic compounds such as dianisidine diisocyanate, 4,4-diphenylether diisocyanate and chlorodiphenylene diisocyanate; the triisocyanates such as triphenylmethane-4,4,4-triisocyanate, 1,3,5-triisocyanatobenzene and 2,4,6-triisocyanatotoluene; the tetraisocyanates such as 4,4- dimethyldiphenylmethane-2,2,5,5-tetraisocyanate; the polymerized polyisocyanates such as tolylene diisocyanate dimers and trimers, and the like. The preferred isocyanate is toluene diisocyanate.

In addition, the isocyanates can be prepolymers derived from polyols including polyether polyol or polyester polyol, including polyols which are reacted with excess polyisocyanates to form isocyanate-terminated prepolymers. These may be simple polyols such as glycols, for example, ethylene glycol and propylene glycol, as well as other polyols such as glycerol, trimethylolpropane, hexanetriol, pentaerythritol, and the like, as well as ether-alcohols such as diethylene glycol, tripropylene glycol and the like and polyethers, that is, alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of approximately 1540, polyoxypropylene glycol having a molecular weight of approximately 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanedio, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

The blocking agent of the blocked isocyanate groups can be an alcohol, including glycol monoethers and amino alcohols. Examples include aliphatic alcohols such as methanol and 2-ethylhexyl alcohol; cycloaliphatic alcohols such as cyclohexanol; aromatic alkyl alcohols such as benzyl alcohol; glycol monoethers such as the monoalkyl ethers of ethylene glycol, i.e. the monobutyl ether of diethylene glycol; and amino alcohols such as dimethylethanolamine. Oximes such as methyl ethyl ketoxime; lactams such as epsilon-caprolactam; aliphatic amines such as dibutylamine and beta-dicarbonyl compounds such as acetyl acetone can also be used. Preferably, the blocking agent is the monobutyl ether of diethylene glycol.

As mentioned above, Y or Y' is a residue derived from an epoxy resin. The epoxy resin is preferably a polyepoxide having a 1,2-epoxy equivalency of 2 or more, most preferably about 2. The preferred polyepoxides are polyglycidyl ethers of cyclic polyols. Particularly preferred are polyglycidyl ethers of polyphenols such as bisphenol A.

Besides the polyglycidyl ethers of polyphenols, epoxy-containing acrylic polymers can be used. These polymers are formed by polymerizing an unsaturated epoxy group-containing monomer such as glycidyl acrylate or glycidyl methacrylate with one or more polymerizable ethylenically unsaturated monomers. Examples of these polymers are described in U.S. Pat. No. 4,001,156.

Several different reaction schemes can be used to prepare the curing agents of the present invention. These are described in the *Journal of Coatings Technology*, volume 55 number 700, page 49-57 (1983). Two synthetic schemes are preferred. These are modifications of the routes 1 and 2 cited in the above reference. In one route (synthetic route 2), a fully blocked polyisocyanate is reacted with a polyepoxide in the presence of a catalyst. It is believed that the blocking agent is liberated from the fully blocked isocyanate and an oxazolidone linkage between the polyepoxide and the polyisocyanate is formed. The resulting reaction product is a mixture of materials comprising: a fully blocked isocyanate; a reaction product derived from the polyepoxide moieties terminated with oxazolidone groups which are in turn linked to blocked isocyanate groups; and polymeric species containing repeating oxazolidone groups and units derived from the polyepoxide. In preparing the curing agents of the present invention, the molar ratio of blocked isocyanate to epoxide is at least 1.1:1.0, but not more than 10.0:1.0; preferably, the molar ratio is between 1.5-5.0:1.0. The use of these ratios results in products which are terminated predominantly with blocked isocyanate groups.

In a preferred reaction, toluene diisocyanate which has been fully blocked with the monobutyl ether of diethylene glycol is reacted in the presence of triethylamine catalyst with the diglycidyl ether of bisphenol A in a molar ratio of 1.75–2.0:1.0. These materials are reacted under a nitrogen atmosphere at 90°–130° C. until analysis indicates substantially complete reaction of the epoxide groups.

Another preferred route (synthetic route 1 in the above reference) for making the oxazolidone-containing curing agents of this invention is by reaction of a partially blocked polyisocyanate with a polyepoxide. In this case, a polyisocyanate containing unblocked isocyanate groups and blocked isocyanate groups is reacted with a polyepoxide in the presence of a catalyst. It is believed that the unblocked isocyanate and epoxide react to form a reaction product containing an oxazolidone linkage and blocked isocyanate groups.

The oxazolidone-containing blocked isocyanate curing agents described above cause substantially less ED-related yellowing in subsequently applied topcoats than diblocked TDI which has not been reacted with polyepoxides. Further, the curing agents cause less yellowing than TDI adducts in which the TDI is adducted with trimethylolpropane (3:1 molar ratio) and the isocyanate groups blocked with a conventional blocking agent such as the monobutyl ether of diethylene glycol.

The active hydrogen-containing ionic resin is present in the cationic electrodepositable coating composition in amounts of about 20 to 99.5 percent, preferably 30 to 70 percent based on the weight of resin solids present in the electrodepositable coating composition. Accordingly, the amount of curing agent is from 0.5 to 80 percent, preferably 70 to 30 percent based on the weight of resin solids present in the electrodepositable coating composition.

The electrodepositable coating compositions of the present invention are in the form of aqueous dispersions. The term "dispersion" refers to a two-phase transparent, translucent or opaque resinous system in which the resin is in the dispersed phase and the water is in the continuous phase. The average particle size of the resinous phase is generally less than 10 and usually less than 5 microns, preferably less than 0.5 microns. The concentration of the resinous phase in the aqueous medium is usually at least 1 percent and usually from about 2 to 60 percent by weight based on weight of the aqueous dispersion. When the compositions of the present invention are in the form of resin concentrates, they generally have a resin solids content of about 26 to 60 percent by weight based on the weight of the aqueous dispersion. When the compositions of the present invention are in the form of electrodepositable coating compositions, the resin solids content of the composition is usually within the range of about 5 to 25 percent by weight based on weight of the electrodepositable coating composition.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. The amount of coalescing solvent is generally between about 0.01 and 25 percent, and when used, preferably from about 0.05 to about 5 percent by weight based on the weight of the electrodepositable coating composition.

In some instances, a pigment composition and if desired, various additives such as surfactants, wetting agents or catalysts are included in the dispersion. The pigment composition may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the present invention, the pigment-to-resin ratio is usually within the range of 0.02:1 to 1:1. The other additives mentioned above are usually in the dispersion in amounts of about 0.01 to 3 percent by weight based on the total solids weight of electrodepositable resins present in the electrodepositable coating composition.

When the electrodepositable coating composition described above is employed for use in electrodeposition, the coating composition is placed in contact with an electrically conductive anode and an electrically conductive cathode with the surface to be coated being the either the cathode or the anode, depending on whether the ionic active hydrogen-containing resin is anionic or cationic; preferably the electrode to be coated is the cathode. Following contact with the coating composition, an adherent film is deposited on one electrode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically is between 50 and 500 volts. The current density is usually between 0.5 and 5 amperes per square foot and tends to decrease during electrodeposition indicating the formation of an insulating film. The coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures for example at 90–260° C. for 1 to 40 minutes.

Illustrating the invention are the following examples which, however, are not to be considered as limiting the invention to their details. All parts and percentages in the examples as well as throughout the specification are by weight unless otherwise indicated. Parts by weight are in grams unless otherwise indicated.

EXAMPLES

The following examples show the formulation of electrodepositable coating compositions with an active hydrogen-containing cationic resin and a curing agent containing blocked aromatic isocyanate groups and oxazolidone groups. For the purposes of comparison, electrodepositable coating compositions were prepared with the same active hydrogen-containing cationic resin and curing agents containing blocked aromatic isocyanate groups but without the oxazolidone groups.

Examples A–B show the preparation of a modifying resin and an active hydrogen-containing resin used to make the electrodepositable coating compositions. Examples I–VI show the preparation of various curing agents used to illustrate the invention, the preparation of electrodepositable compositions and the use of these compositions in the process of electrodeposition.

The electrodepositable coating compositions were tested for their tendency to cause fume-yellowing in subsequently applied topcoat systems by the following method: the electrodepositable coating compositions were electrocoated onto open-ended ½-pint rimless steel cans. The electrocoated cans were sealed with aluminum foil, then the coatings on the cans were cured. Any volatiles released from the coatings were trapped within the foil-sealed cans. The foil was then removed from one end of the electrocoated cans and the cans were placed on steel panels which were previously coated with an aminoplast-polyester-acrylic sprayable white topcoat, commercially available from PPG Industries, Inc. as DHT-5920. A spacer, such as a paper clip, was placed under the rim of the can to produce a small vent from the inside of the can. The steel panels with the cans on them were then baked so as to cure the topcoat in the areas of the steel panels that are not covered by the electrocoated cans. The topcoat in the areas of the steel panels covered by the electrocoated cans were found to be only partially cured. The partially cured topcoat in the areas of the steel panels covered by the electrocoated cans were then evaluated visually for yellowness and ranked on a scale of zero to ten where zero represents the most yellowed topcoat color and ten represents an unyellowed topcoat color.

Table I shows the results of a comparison of the electrodepositable coating compositions of Examples I–VI for fume yellowing.

EXAMPLE A

Preparation of a Modifying Resin

A polyepoxide polyoxyalkylenediamine modifying resin was prepared. The modifying resin provides better appearance in the cured electrodeposited coating. In order to prepare the modifying resin, an intermediate polyepoxide was prepared from the following mixture of ingredients:

| INGREDIENTS | PARTS BY WEIGHT |
|---|---|
| EPON 828[1] | 1000.0 |
| Bisphenol A[2] | 308.1 |
| Ethyltriphenyl phosphonium iodide | 1.3 |

| INGREDIENTS | PARTS BY WEIGHT |
| --- | --- |
| 2-Butoxyethanol | 413.5 |

[1] The diglycidyl ether of bisphenol A which is commercially available from Shell Corporation.
[2] A polyphenol commercially available from Shell Corporation.

The EPON 828 and the bisphenol A were charged to a reaction vessel under a nitrogen blanket and heated to 110° C. The reaction mixture was held at 110° C. until all the bisphenol A had dissolved whereupon the ethyltriphenyl phosphonium iodide catalyst was added and the reaction mixture was heated to 160° C. where it was held for an hour to complete reaction. When the hold was over, the 2-butoxyethanol was added to give a solids content of 76% and an epoxy equivalent of 504 (based on solids.)

The modifying resin was then prepared from the following mixture of ingredients:

| INGREDIENTS | PARTS BY WEIGHT |
| --- | --- |
| JEFFAMINE D-2000[1] | 2362.2 |
| Polyepoxide intermediate prepared as described above | 1141.6 |
| 2-Butoxyethanol | 296.1 |
| 88% Aqueous Lactic Acid | 96.6 |
| Deionized Water | 5279.1 |

[1] A polyoxypropylenediamine having a molecular weight of 2000, commercially available from Texaco Chemical Company.

The JEFFAMINE D-2000 was charged to a reaction vessel under a nitrogen atmosphere and heated to 90° C. The polyepoxide intermediate and the 2-butoxyethanol were added over a one-half hour period. At the completion of the addition, the reaction mixture was heated to 130° C. and held for three hours. The resin was then dispersed by pouring it into a mixture of 88% lactic acid and deionized water. The resulting reaction product had a solids content of 36%.

EXAMPLE B

Preparation of an Active Hydrogen-Containing Resin

An active hydrogen-containing resin was prepared from the following mixture of ingredients:

| INGREDIENTS | PARTS BY WEIGHT |
| --- | --- |
| EPON 828 | 2729.20 |
| Bisphenol A | 791.20 |
| MACOL 98[1] | 971.60 |
| Methyl Isobutyl Ketone | 160.00 |
| Benzyldimethylamine | 4.04 |
| Benzyldimethylamine | 10.78 |
| Methyl Isobutyl Ketone | 985.50 |
| Diketimine[2] | 292.28 |
| N-methylethanolamine | 257.79 |

[1] Polyol derived from bisphenol A and ethylene oxide, commercially available from Mazur Chemical Company at 100% solids.
[2] Diketimine derived from diethylene triamine and methyl isobutyl ketone and supplied at 72% solids in methyl isobutyl ketone.

The EPON 828, bisphenol A, MACOL 98 and methyl isobutyl ketone were charged into a reaction vessel and heated under a nitrogen atmosphere to 140° C. The first portion of the benzyldimethylamine was added and the reaction mixture allowed to exotherm to 155° C. The reaction mixture was heated to 160° C., held until an epoxy equivalent weight of 626.9 was obtained, cooled further to 145° C. and the second portion of benzyldimethylamine added. The reaction was held at 145° C. until an epoxy equivalent weight of 1054.5 was obtained. At this point, 985.5 g of methyl isobutyl ketone was added and the reaction mixture cooled to 114° C. and the diketimine and the N-methylethanolamine were added in succession. The mixture was allowed to exotherm and then a temperature of 125° C. was established and held for one hour. Finally, the mixture was cooled and poured out.

EXAMPLE I (COMPARATIVE)

Preparation of an Electrodepositable Coating Composition Using Diblocked TDI

This example illustrates the preparation of an electrodepositable coating composition with an active hydrogen-containing cationic resin and a curing agent containing blocked aromatic isocyanate groups and no oxazolidone groups. The aromatic isocyanate groups are represented by the diblocked toluene diisocyanate (TDI). This is a comparative example which shows the degree to which electrodepositable coating compositions of the prior art produced fume yellowing in subsequently applied topcoats.

A diblocked isocyanate curing agent based on TDI was prepared from the following mixture of ingredients:

| INGREDIENTS | PARTS BY WEIGHT |
| --- | --- |
| MONDUR TD80[1] | 435.00 |
| Butyl CARBITOL[2] | 810.00 |
| Methyl Isobutyl Ketone | 415.00 |

[1] An 80/20 mixture of 2,4- and 2,6-toluene diisocyanates (TDI) commercially available from Miles Chemical Company.
[2] The monobutyl ether of diethylene glycol commercially available from Union Carbide Corporation.

The butyl CARBITOL and methyl isobutyl ketone were charged to a reaction flask under a nitrogen atmosphere and heated to 85° C. The MONDUR TD80 isocyanate was added slowly while holding the temperature at 85°-100° C. until analysis by infrared spectroscopy indicated no unreacted isocyanate remained.

An electrodepositable resin was prepared which contains the curing agent described above from the following mixture of ingredients:

| INGREDIENTS | PARTS BY WEIGHT |
| --- | --- |
| Active Hydrogen-Containing Base Resin of Example B | 700.00 |
| Curing Agent, as prepared above | 313.24 |
| 100% Sulfamic Acid | 39.37 |
| Deionized Water | 1543.45 |

The active hydrogen-containing base resin and the curing agent were charged to a reaction flask under a nitrogen atmosphere and heated to 80° C. The heat was turned off and the nitrogen was removed, then the sulfamic acid was added followed by the slow addition of the deionized water while the temperature decreased to 45° C. The aqueous dispersion was heated to 50°-55° C. under a vacuum of 22-25 inches of Hg and 233 grams of a distillate comprising methyl isobutyl ketone and water were removed to produce a dispersed resin with a solids content of 34.96%.

An electrodepositable coating composition was prepared from the following mixture of ingredients:

| INGREDIENTS | PARTS BY WEIGHT |
| --- | --- |
| Electrodepositable Resin as prepared above | 1493.40 |
| Modifying Resin of Example A | 153.70 |
| PARAPLEX WP-1[1] | 36.90 |
| Hexyl CELLOSOLVE[2] | 10.00 |
| E5994 Paste[3] | 398.70 |
| Deionized Water | 1707.30 |

[1] A propoxylated cresol, commercially available from Rohm and Haas.
[2] The monohexyl ether of diethylene glycol, commercially available from Union Carbide Corporation.
[3] A milled dispersion commercially available from PPG Industries, Inc. which contains 46.2% titanium dioxide, 1.5% carbon black, 3.4% basic lead silicate, and 2.6% dibutyltin oxide; the percentages being by weight based on the total weight of the pigment paste.

This coating composition was electrodeposited onto a ½-pint rimless steel can, with said can acting as the cathode. The coating composition was heated to 85° F. (29° C.) under gentle agitation, then a voltage of 200 volts was impressed between the electrodes for two minutes to achieve a film build of about 1.1 mils (0.0028 cm). The rimless steel can was removed from the coating composition, rinsed with a spray of tap water, then baked to produce a cured film. The coated cans were evaluated for fume yellowing and the results are reported in Table I below.

EXAMPLE II (COMPARATIVE)

Preparation of an Electrodepositable Coating Composition Using Modified TDI

This example illustrates the preparation of an electrodepositable coating composition with an active hydrogen-containing cationic resin and a curing agent containing blocked aromatic isocyanate groups and no oxazolidone groups. The aromatic isocyanate groups are contributed by TDI, which has been modified by adduct formation with trimethylolpropane. The unreacted isocyanate groups are blocked with the monobutyl ether of diethylene glycol. This is a comparative example which shows the degree to which electrodepositable coating compositions of the prior art which contain higher molecular weight curing agents produce fume yellowing in subsequently applied topcoats.

A fully blocked polyisocyanate curing agent based on TDI was prepared from the following mixture of ingredients:

| INGREDIENTS | PARTS BY WEIGHT |
| --- | --- |
| MONDUR TD80 | 1044.00 |
| Methyl Isobutyl Ketone | 381.00 |
| Butyl CARBITOL | 973.33 |
| Methyl Isobutyl Ketone | 381.00 |
| Dibutyltin Dilaurate | 0.58 |
| Trimethylolpropane | 89.40 |
| Trimethylolpropane | 89340 |
| Trimethylolpropane | 89.40 |
| Dibutyltin Dilaurate | 0.18 |

The MONDUR TD80 and 381.00 g of methyl isobutyl ketone were charged to a reaction flask. The butyl CARBITOL was added over a three hour period while maintaining a temperature of no more than 60° C. Upon completion of the addition, the reaction mixture was held at 65° C. for 60 minutes. The dibutyltin dilaurate and 381.00 grams of methyl isobutyl ketone were added while the mixture was held at 80° C. The material was then cooled to 74° C. and held for 20 minutes. The first portion of the trimethylolpropane was added while maintaining the temperature of 75° C., then the material was held at this temperature for 20 minutes. The second portion of the trimethylolpropane was added while maintaining the temperature at 85° C., then the material was held at this temperature for 20 minutes. The final portion of the trimethylolpropane was added while maintaining the temperature at 96° C., then the material was held at this temperature for 20 minutes. The material was then heated to 105° C. and held for one hour. The 0.18 g of dibutyltin dilaurate were added and the material was held at 105° C. until analysis by infrared spectrosopy indicated no unreacted isocyanate remained.

An electrodepositable resin was prepared which contained the curing agent described above from the following mixture of ingredients:

| INGREDIENTS | PARTS BY WEIGHT |
| --- | --- |
| Active Hydrogen-Containing Resin of Example B | 700.0 |
| Curing Agent, as prepared above | 478.91 |
| Sulfamic Acid | 39.37 |
| Deionized Water | 1754.31 |

The active hydrogen-containing resin and the curing agent were charged to a reaction flask under a nitrogen atmosphere and heated to 80° C. The heat was turned off and the nitrogen was removed, then the sulfamic acid was added followed by slow addition of deionized water while the temperature decreased to 45° C. The aqueous dispersion was heated to 50°-55° C. under a vacuum of 22-25 inches of Hg and 278 grams of a distillate comprising methyl isobutyl ketone and water were removed to produce a dispersed resin with a solids content of 37.24%.

An electrodepositable coating composition was prepared from the following mixture of ingredients:

| INGREDIENTS | PARTS BY WEIGHT |
| --- | --- |
| Electrodepositable Resin as prepared above | 1405.10 |
| Modifying Resin of Example A | 153.70 |
| PARAPLEX WP-1 | 36.90 |
| Hexyl CELLOSOLVE | 10.00 |
| E5994 Paste | 398.70 |
| Deionized Water | 1795.60 |

This coating composition was electrodeposited onto a ½-pint rimless steel can, cured and evaluated for fume yellowing as generally described in Example I.

EXAMPLE III (COMPARATIVE)

Preparation of an Electrodepositable Coating Composition Using Modified Crude MDI This example illustrates the preparation of an electrodepositable coating composition with an active hydrogen-containing cationic resin and a curing agent containing blocked aromatic isocyanate groups and no oxazolidone groups. The aromatic isocyanate groups are derived from fully-blocked crude MDI, which has a higher molecular weight than TDI. This is a comparative example which shows the degree to which electrodepositable coating compositions of the prior art which contain higher molecular weight curing agents produce fume yellowing in subsequently applied topcoats.

A fully blocked polyisocyanate curing agent based on crude MDI was prepared from the following mixture of ingredients:

| INGREDIENTS | PARTS BY WEIGHT |
|---|---|
| MONDUR MRS-4[1] | 4095.0 |
| Methyl Isobutyl Ketone | 2199.6 |
| Dibutyltin dilaurate | 6.2 |
| 2-(2-Butoxyethoxy)ethanol | 3353.0 |
| Trimethylol propane | 356.1 |
| 2-(2-Butoxyethoxy)ethanol | 464.2 |

[1]Polymeric diphenylmethane diisocyanate crude MDI commercially available Mobay Chemical Company.

The MONDUR MRS-4, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60° and 65° C. Upon completion of the addition, the reaction mixture was held at 65° C. for 90 minutes. The trimethylol propane was then added and the mixture heated to 110° C. and held for three hours whereupon the final portion of the 2-(2-butoxyethoxy)ethanol was added. The 110° C. hold was continued until analysis by infrared spectroscopy indicated no unreacted isocyanate remained.

An electrodepositable resin was prepared which contains the curing agent described above from the following mixture of ingredients:

| INGREDIENTS | PARTS BY WEIGHT |
|---|---|
| Active Hydrogen-Containing Resin of Example B | 700.00 |
| Curing Agent, as prepared above | 410.36 |
| Sulfamic Acid | 39.37 |
| Deionized Water | 1716.80 |

The active hydrogen-containing resin and the curing agent were charged to a reaction flask under a nitrogen atmosphere and heated to 80° C. The heat was turned off and the nitrogen was removed, then the sulfamic acid was added followed by slow addition of deionized water while the temperature decreased to 45° C. The aqueous dispersion was heated to 50°-55° C. under a vacuum of 22-25 inches of Hg and 298 grams of a distillate comprising methyl isobutyl ketone and water were removed to produce a dispersed resin with a solids content of 36.21%.

An electrodepositable coating composition was prepared from the following mixture of ingredients:

| INGREDIENTS | PARTS BY WEIGHT |
|---|---|
| Electrodepositable Resin as prepared above | 1443.90 |
| Modifying Resin of Example A | 153.70 |
| PARAPLEX WP-1 | 36.90 |
| Hexyl CELLOSOLVE | 10.00 |
| E5994 Paste | 398.70 |
| Deionized Water | 1756.80 |

This coating composition was electrodeposited onto a ½-pint rimless steel can, cured and evaluated for fume yellowing as generally described in Example I.

EXAMPLE IV

Preparation of an Electrodepositable Coating Composition Using an Oxazolidone Group-Containing Curing Agent This example illustrates the preparation of an electrodepositable coating composition with an active hydrogen-containing cationic resin and a curing agent containing blocked aromatic isocyanate groups and oxazolidone groups. The aromatic isocyanate groups are contributed by TDI which is blocked with the monobutyl ether of diethylene glycol. This example shows the degree to which the electrodepositable coating compositions of the preferred embodiment of the present invention resist ED-related yellowing in subsequently applied topcoats.

An isocyanate curing agent based on TDI and also containing oxazolidone groups was prepared. First, partially blocked TDI was prepared from the following mixture of ingredients:

| INGREDIENTS | PARTS BY WEIGHT |
|---|---|
| Butyl CARBITOL | 1944.00 |
| MONDUR TD80 | 2088.0 |
| Dibutyltin Dilaurate | 2 drops |

The MONDUR TD80 was charged to a reaction flask under a nitrogen atmosphere. The butyl CARBITOL was added slowly and the temperature was maintained at 35°-40° C. After four hours, the two drops of dibutyltin dilaurate was added. No exotherm was observed. The temperature was maintained at 30° C. for another hour, at which time analysis showed that 60.2% of the isocyanate groups, which were initially present, remained. The sample was held at room temperature overnight and analysis showed 53.2% of the initially present isocyanate groups remained.

An oxazolidone group-containing curing agent was prepared from the following mixture of ingredients:

| INGREDIENTS | PARTS BY WEIGHT |
|---|---|
| EPON 828 | 376.00 |
| TDI, partially blocked with Butyl CARBITOL, as prepared above | 694.30 |
| Tetraethylammonium Bromide | 1.20 |
| Methyl Isobutyl Ketone | 357.20 |

The EPON 828 and the tetraethylammonium bromide were charged to a reaction flask under a nitrogen atmosphere and heated to 160° C. The partially blocked TDI was added slowly while holding the temperature at 160° C. After the addition, the reaction mixture was held at 160° C. until analysis by infrared spectroscopy indicated no unreacted isocyanate remained and until an epoxy equivalent weight of 12,372.1 was reached. The methyl isobutyl ketone was added while the mixture was cooling.

An electrodepositable resin was prepared which contains the curing agent described above from the following mixture of ingredients:

| INGREDIENTS | PARTS BY WEIGHT |
|---|---|
| Active Hydrogen-Containing Resin of Example B | 700.00 |
| Curing Agent, as prepared above | 612.64 |
| Sulfamic Acid | 39.37 |

-continued

| INGREDIENTS | PARTS BY WEIGHT |
|---|---|
| Deionized Water | 1924.51 |

The active hydrogen-containing resin and the curing agent were charged to a reaction flask under a nitrogen atmosphere and heated to 80° C. The heat was turned off and the nitrogen was removed, then the sulfamic acid was added followed by slow addition of deionized water while the temperature decreased to 45° C. The aqueous dispersion was heated to 50°-55° C. under a vacuum of 22-25 inches of Hg and 353 grams of a distillate comprising methyl isobutyl ketone and water were removed to produce a dispersed resin with a solids content of 36.49%.

An electrodepositable coating composition was prepared from the following mixture of ingredients:

| INGREDIENTS | PARTS BY WEIGHT |
|---|---|
| Electrodepositable Resin as prepared above | 1432.10 |
| Modifying Resin of Example A | 153.70 |
| PARAPLEX WP-1 | 36.90 |
| Hexyl CELLOSOLVE | 10.00 |
| E5994 Paste | 398.70 |
| Deionized Water | 1768.60 |

This coating composition was electrodeposited onto a ½-pint rimless steel can, cured and evaluated for fume yellowing as generally described in Example I.

EXAMPLE V

Preparation of an Electrodepositable Coating Composition Using an Oxazolidone Curing Agent with an Alternate Blocking Agent This example illustrates the preparation of an electrodepositable coating composition with an active hydrogen-containing cationic resin and a curing agent containing blocked aromatic isocyanate groups and oxazolidone groups. The aromatic isocyanate groups are derived from TDI which is blocked with 2-butoxyethanol. This example shows the degree to which the electrodepositable coating compositions of the present invention resist ED-related yellowing in subsequently applied topcoats.

An isocyanate curing agent based on TDI and also containing oxazolidone groups was prepared. This curing agent was blocked with 2-butoxyethanol. First, partially blocked TDI was prepared from the following mixture of ingredients:

| INGREDIENTS | PARTS BY WEIGHT |
|---|---|
| Butyl CELLOSOLVE[1] | 590.00 |
| MONDUR TD80 | 870.00 |

[1]2-butoxyethanol, commercially available from Union Carbide Corp.

The MONDUR TD80 was charged to a reaction flask under a nitrogen atmosphere. The butyl CELLOSOLVE was added slowly and the temperature was maintained at 35°-40° C. during the addition. After five hours, analysis showed that 56.2% of the isocyanate groups, which were initially present, remained. The sample was stored overnight and analysis showed that 53.7% of the initially present isocyanate groups remained.

A curing agent was prepared from the following mixture of ingredients:

| INGREDIENTS | PARTS BY WEIGHT |
|---|---|
| EPON 828 | 376.00 |
| TDI, partially blocked with butyl CELLOSOLVE, as prepared above | 598.40 |
| Tetraethylammonium Bromide | 1.20 |
| Methyl isobutyl ketone | 325.20 |

The EPON 828 and the tetraethylammonium bromide were charged to a reaction flask under a nitrogen atmosphere and heated to 160° C. The partially blocked TDI was added slowly while holding the temperature at 160° C. until analysis by infrared spectroscopy indicated no unreacted isocyanate remained and until an epoxy equivalent weight of 20,000+ was reached. The methyl isobutyl ketone was added while the mixture was cooling.

An electrodepositable resin was prepared which contains the curing agent described above from the following mixture of ingredients:

| INGREDIENTS | PARTS BY WEIGHT |
|---|---|
| Active Hydrogen-Containing Resin of Example B | 700.00 |
| Curing Agent, as prepared above | 557.83 |
| Sulfamic Acid | 39.37 |
| Deionized Water | 1854.75 |

The active hydrogen-containing resin and the curing agent were charged to a reaction flask under a nitrogen atmosphere and heated to 80° C. The heat was turned off and the nitrogen was removed, then the sulfamic acid was added followed by the slow addition of deionized water while the temperature decreased to 45° C. The aqueous dispersion was heated to 50°-55° C. under a vacuum of 22-25 inches of Hg and 378 grams of a distillate comprising methyl isobutyl ketone and water were removed to produce a dispersed resin with a solids content of 36.29%.

An electrodepositable coating composition was prepared from the following mixture of ingredients:

| INGREDIENTS | PARTS BY WEIGHT |
|---|---|
| Electrodepositable Resin as prepared above | 1439.90 |
| Modifying Resin of Example A | 153.70 |
| PARAPLEX WP-1 | 36.90 |
| Hexyl CELLOSOLVE | 10.00 |
| E5994 Paste | 398.70 |
| Deionized Water | 1760.80 |

This coating composition was electrodeposited onto a ½-pint rimless steel can, cured and evaluated for fume yellowing as generally described in Example I.

EXAMPLE VI

Preparation of an Electrodepositable Coating Composition Using an Oxazolidone Curing Agent Prepared With The Diglycidyl Ether of Polypropylene Glycol This example illustrates the preparation of an electrodepositable coating composition with an active hydrogen-containing cationic resin and a curing agent containing blocked aromatic isocyanate groups and oxazolidone groups. The aromatic isocyanate groups are contributed by TDI which is blocked with the monobutyl ether of diethylene glycol. The curing agent used to make this resin was prepared with the diglycidyl ether of polypropylene glycol. This example shows the degree to which the electrodepositable coating compositions of the present invention resist ED-related yellowing in subsequently applied topcoats.

An isocyanate curing agent based on TDI and also containing oxazolidone groups was prepared. This curing agent was prepared with the diglycidyl ether of polypropylene glycol. First, partially blocked TDI was prepared from the following mixture of ingredients:

| INGREDIENTS | PARTS BY WEIGHT |
|---|---|
| Butyl CARBITOL | 1944.00 |
| MONDUR TD80 | 2088.0 |
| Dibutyltin Dilaurate | 2 drops |

The MONDUR TD80 was charged to a reaction flask under a nitrogen atmosphere. The butyl CARBITOL was added slowly and the temperature was maintained at 35°-40° C. After four hours, the two drops of dibutyltin dilaurate was added. No exotherm was observed. The temperature was maintained at room temperature overnight after which time the NCO equivalent weight was 315.6.

A curing agent was prepared from the following mixture of ingredients:

| INGREDIENTS | PARTS BY WEIGHT |
|---|---|
| DER736[1] | 338.20 |
| TDI, partially blocked with Butyl CARBITOL, as prepared above | 694.30 |
| Tetraethylammonium Bromide | 1.20 |
| Methyl isobutyl ketone | 344.60 |

[1]Diglycidyl ether of polypropylene glycol, commercially available from Dow Chemical Co. at 100% solids.

The DER736 and the tetraethylammonium bromide were charged to a reaction flask under a nitrogen atmosphere and heated to 160° C. The partially blocked TDI was added slowly while holding the temperature at 160° C. until analysis by infrared spectroscopy indicated no unreacted isocyanate remained and until an epoxy equivalent weight of 20,000+ was reached. The methyl isobutyl ketone was added while the mixture was cooling.

An electrodepositable resin was prepared which contains the curing agent described above from the following mixture of ingredients:

| INGREDIENTS | PARTS BY WEIGHT |
|---|---|
| Active Hydrogen-Containing Resin of Example B | 700.00 |
| Curing Agent, as prepared above | 591.13 |
| Sulfamic Acid | 39.37 |
| Deionized Water | 1897.13 |

The active hydrogen-containing resin and the curing agent were charged to a reaction flask under a nitrogen atmosphere and heated to 80° C. The heat was turned off and the nitrogen was removed, then the sulfamic acid was added followed by the slow addition of the deionized water while the temperature decreased to 45° C. The aqueous dispersion was heated to 50°-55° C. under a vacuum of 22-25 inches of Hg and 415 grams of a distillate comprising methyl isobutyl ketone and water were removed to produce a dispersed resin with a solids content of 37.46%.

An electrodepositable coating composition was prepared from the following mixture of ingredients:

| INGREDIENTS | PARTS BY WEIGHT |
|---|---|
| Electrodepositable Resin as prepared above | 1393.80 |
| Modifying Resin of Example A | 153.70 |
| PARAPLEX WP-1 | 36.90 |
| Hexyl CELLOSOLVE | 10.00 |
| E5994 Paste | 398.70 |
| Deionized Water | 1806.80 |

This coating composition was electrodeposited onto a ½-pint rimless steel can, cured and evaluated for fume yellowing as generally described in Example I.

TABLE I

| | A COMPARISON OF ED-RELATED YELLOWING OF THE COMPOSITIONS OF EXAMPLE I-VI | | | |
|---|---|---|---|---|
| | ELECTROCOAT BAKE SCHEDULE: 30 MINUTES/ 340° F. (171° C.) | ELECTROCOAT BAKE SCHEDULE: 30 MINUTES/ 360° F. (182° C.) | ELECTROCOAT BAKE SCHEDULE: 30 MINUTES/ 380° F. (193° C.) | ELECTROCOAT BAKE SCHEDULE: 30 MINUTES/ 400° F. (204° C.) |
| EXAMPLE I (COMPARATIVE) | 5.00 | 3.75 | 3.00 | 4.00 |
| EXAMPLE II (COMPARATIVE) | 4.50 | 3.50 | 0.00 | 0.00 |
| EXAMPLE III (COMPARATIVE) | 9.00 | 8.25 | 7.75 | 9.50 |
| EXAMPLE IV | 6.00 | 4.50 | 4.00 | 8.75 |
| EXAMPLE V | 5.00 | 4.50 | 4.00 | 8.00 |
| EXAMPLE VI | 9.00 | 9.00 | 10.00 | 10.00 |

NOTE:
Yellowness was visually rated on a scale of zero to ten, with zero representing the most yellowed topcoat and ten representing an unyellowed topcoat.

I claim:
1. An electrodepositable coating composition comprising:
A. an active hydrogen-containing ionic resin; and
B. a curing agent which contains blocked isocyanate groups and groups of the following structure:

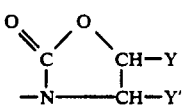

where Y and Y' are different and are hydrogen and a residue derived from an epoxy resin.

2. The composition of claim 1 wherein the active hydrogen containing ionic resin is cationic.

3. The composition of claim 1 wherein the active hydrogen containing ionic resin is chosen from the group consisting of: acrylic polymers, polyester polymers, polyurethane polymers, polymers derived from epoxy-containing materials, and mixtures thereof.

4. The composition of claim 1 wherein the active hydrogen containing ionic resin is the cationic reaction product of an epoxy group-containing material and an amine.

5. The composition of claim 1 wherein the curing agent contains groups of the following structure:

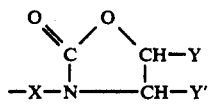

where X is a residue of an isocyanate and Y and Y' are different and are hydrogen and a residue derived from an epoxy resin.

6. The composition of claim 5 wherein X is the residue of an aromatic isocyanate.

7. The composition of claim 5 wherein X is the residue of an aromatic polyisocyanate.

8. The composition of claim 5 wherein the curing agent is of the following structure:

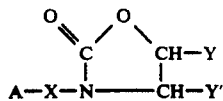

where X is a residue derived from a polyisocyanate; and where A is a blocked isocyanate group of the structure:

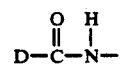

where D is a radical derived from the group consisting of alcohols, lactams, ketoximes, aliphatic amines and beta-dicarbonyl compounds and where Y and Y' are different and are hydrogen and a residue derived from an epoxy resin.

9. The composition of claim 8 in which the epoxy resin is a polyepoxide.

10. The composition of claim 8 wherein the polyepoxide is a polyglycidyl ether of a polyhydric phenol.

11. The composition of claim 8 where X is a residue derived from an aromatic polyisocyanate.

* * * * *